Figure 1:
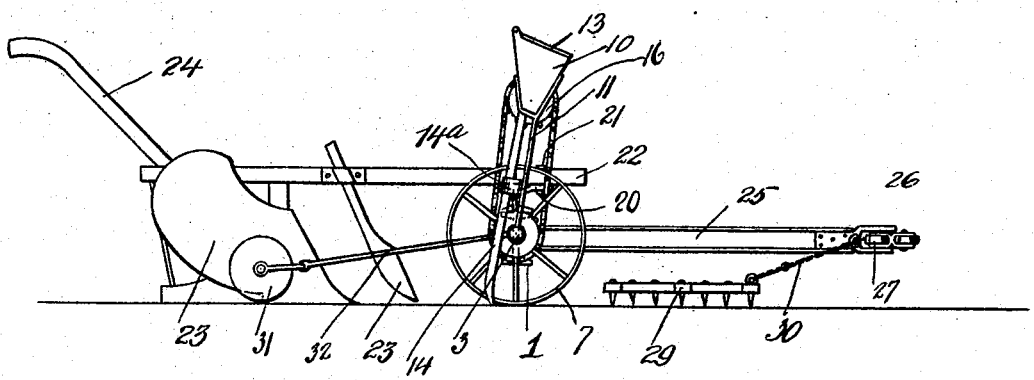

M. SZARKA.
AGRICULTURAL IMPLEMENT.
APPLICATION FILED MAY 20, 1909.

937,485.

Patented Oct. 19, 1909.
2 SHEETS—SHEET 1.

Witnesses
Samuel Payne
R. H. Butler

Inventor
M. Szarka
By H. C. Evert & Co.
Attorneys

M. SZARKA.
AGRICULTURAL IMPLEMENT.
APPLICATION FILED MAY 20, 1909.
937,485.
Patented Oct. 19, 1909.
2 SHEETS—SHEET 2.
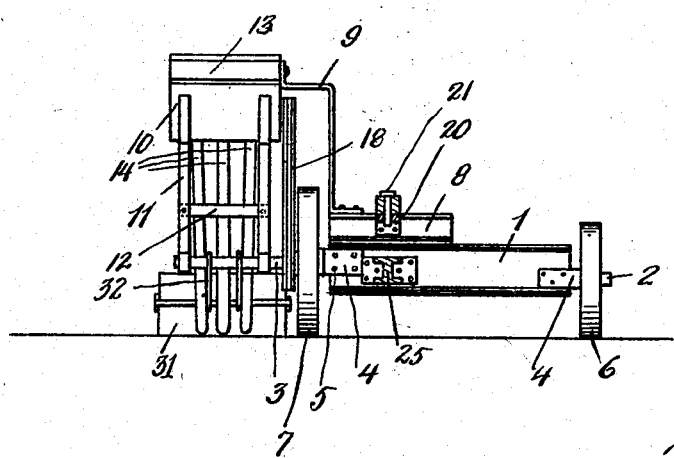
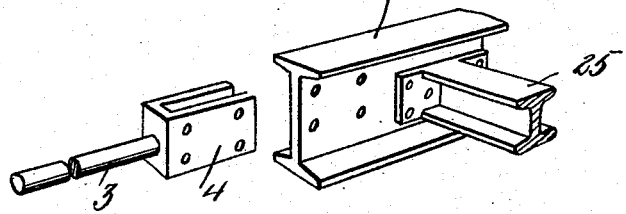
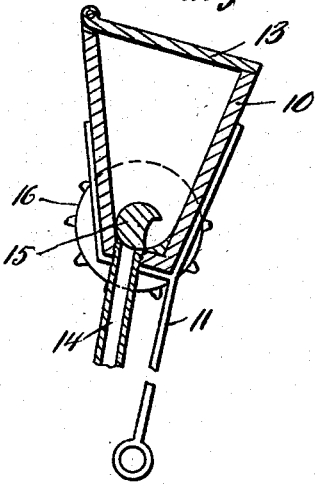
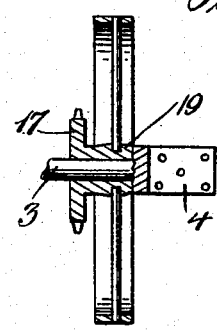
Witnesses
Samuel Payne
K. H. Butler
Inventor
M. Szarka
By H. C. Evert
Attorneys

UNITED STATES PATENT OFFICE.

MIKHÁEL SZARKA, OF EPTON, PENNSYLVANIA.

AGRICULTURAL IMPLEMENT.

937,485.    Specification of Letters Patent.    Patented Oct. 19, 1909.

Application filed May 20, 1909. Serial No. 497,260.

*To all whom it may concern:*

Be it known that I, MIKHÁEL SZARKA, a subject of the King of Hungary, residing at Epton, in the county of Allegheny and State of Pennsylvania, have invented certain new and useful Improvements in Agricultural Implements, of which the following is a specification, reference being had therein to the accompanying drawing.

This invention relates to agricultural implements, and the object of the invention is to provide a strong and durable implement for plowing, harrowing and planting, one furrow being produced while another furrow is harrowed and seed planted, this operation being performed by a special designed implement that will be hereinafter described in detail and then claimed.

In the drawings forming a part of this specification, there is illustrated a preferred embodiment of the invention, but it is to be understood that the structural elements thereof can be varied or changed, as to the size, proportion and manner of assemblage without departing from the spirit of the invention.

Figure 2:
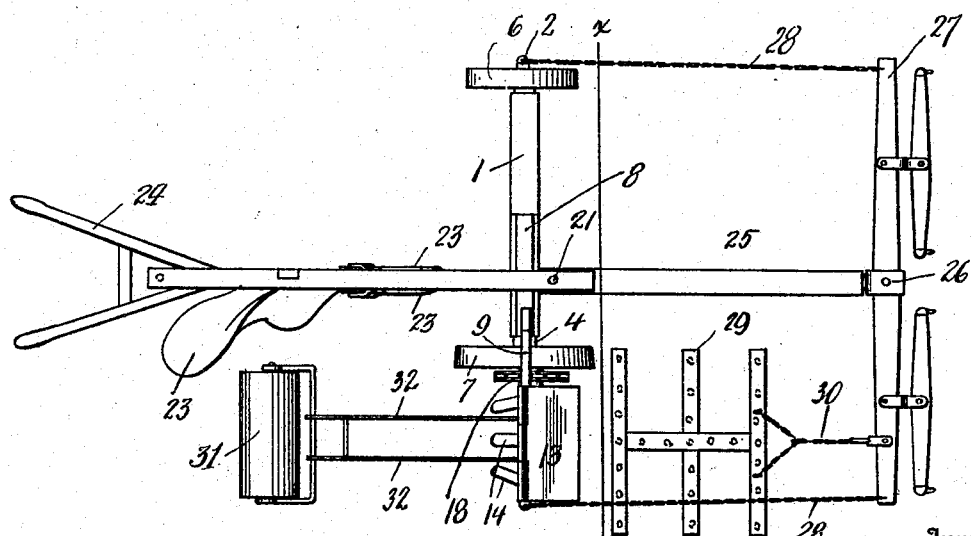

In the drawings, Figure 1 is an elevation an implement constructed in accordance with my invention, Fig. 2 is a plan of the same, Fig. 3 is a cross sectional view taken on the line X—X of Fig. 2 looking toward the rear end of the implement, Fig. 4 is a perspective view of a portion of a beam and axle forming part of the implement, Fig. 5 is an enlarged vertical sectional view of a seed hopper, and Fig. 6 is a transverse sectional view of a sprocket wheel forming part of the implement.

In the drawings, 1 designates an I-beam constituting an axle and having the ends thereof provided with spindles 2 and 3, said spindles having bifurcated ends 4 fitting upon the ends of the beam and secured thereto by rivets or similar fastening means 5.

6 designates a small wheel revolubly mounted upon the spindle 2, and 7 a large wheel revolubly mounted upon the spindle axle 3 adjacent to the bifurcated end thereof.

8 designates a bolster secured upon the beam 1 contiguous to the large wheel 7, and secured to said bolster is a bracket 9, connected to a seed box 10, and said box is further supported by uprights 11 loosely mounted upon the spindle 3, said uprights being connected by a brace 12. The seed box 10 is provided with a hinged lid 13 and with depending conducting spouts 14, said spouts being connected, as at 14$^a$, to the brace 12. Seed is admitted to said spouts from the box 10 by a revoluble feeder roll 15 located and journaled at the bottom of said box, said roller being revolved through the medium of sprocket wheels 16 and 17 and an endless sprocket chain 18. The sprocket wheel 16 is carried by the roll 15 and the sprocket wheel 17 by the hub 19 of the wheel 7.

20 designates an arm carried by the bolster 8 and connected to said arm by a pin 21 is a plow beam 22 having the ordinary and well known type of plow blades 23, and handles 24.

25 designates a tongue secured to the front side of the beam 1 and extending forwardly in longitudinal alinement with the plow beam 22. Secured to the forward end of the tongue 25 is a clevis 26 for attachment of a whiffletree 27. The ends of this whiffletree are connected by chains 28 to the outer ends of the spindles 2 and 3.

29 designates a harrow connected to the whiffletree 27 by a chain 30, said harrow being located in front of the spindle 3.

31 designates a revoluble roller connected to the spindle 3 by straps 32, said roller being in the rear of said spindle and following the conducting spouts 14.

It will be observed from the novel arrangement of the plow, harrow, planter and roller 31, that while a furrow is being provided, an adjoining furrow can be harrowed, seed sown, and properly planted.

In combining the implements heretofore separately used, I save considerable labor and time, and provide an implement that can be used to advantage, upon large farms. The implement conforms to a truck to which a plow beam can be easily attached to steady and retain the truck in proper position during operation.

Having now described my invention, what I claim as new, is;—

1. An implement of the type described, comprising a beam, spindles carried by the ends of said beam, wheels revolubly mounted upon said spindles, a bolster carried by said beam, a plow beam connecting with said bolster, a seed box supported from said bolster above one of said spindles, conducting spouts carried by said seed box, means actuated by a movement of said implement for feeding seed from said box into said spouts, a tongue connecting with said beam, a whiffletree supported by the forward end of said tongue and connecting with the outer ends of said axles.

2. An implement of the type described, comprising a beam, spindles carried by the ends of said beam, wheels revolubly mounted upon said spindles, a bolster carried by said beam, a plow beam connecting with said bolster, a seed box supported from said bolster above one of said spindles, conducting spouts carried by said seed box, means actuated by a movement of said implement for feeding seed from said box into said spouts, a tongue connecting with said beam, a whiffletree supported by the forward end of said tongue and connecting with the outer ends of said axles, a harrow connected to said whiffletree, and a roller connected to one of said spindles in the rear of said harrow.

In testimony whereof I affix my signature in the presence of two witnesses.

MIKHÁEL SZARKA.

Witnesses:
   A. H. RABSÁG,
   A. J. TRIGG.